United States Patent [19]

Edgar

[11] Patent Number: 5,517,783
[45] Date of Patent: May 21, 1996

[54] LURE CONTAINER

[76] Inventor: Dwight A. Edgar, P.O. Box 1814, Islamorada, Fla. 33036

[21] Appl. No.: 195,188

[22] Filed: Feb. 14, 1994

[51] Int. Cl.$^6$ ................................................. A01K 97/06
[52] U.S. Cl. ........................................ 43/57.1; 43/54.1
[58] Field of Search ............................... 43/54.1, 57.1, 43/57.2, 25.2; 206/315.11

[56] References Cited

U.S. PATENT DOCUMENTS

| | | | |
|---|---|---|---|
| 566,595 | 8/1896 | Magnuson | 43/57.2 |
| 890,017 | 6/1908 | Buckle | 43/54.1 |
| 1,999,779 | 4/1935 | Perrine | 43/57.2 |
| 2,285,888 | 6/1942 | Benton | 43/25.2 |
| 2,710,483 | 6/1955 | Lindsay | 43/57.2 |
| 2,767,502 | 10/1956 | Reynolds | 43/54.1 |
| 2,846,806 | 8/1958 | Gaines | 43/57.1 |
| 2,849,825 | 9/1958 | Reisner | 43/57.1 |
| 4,383,385 | 5/1983 | Myers | 43/57.1 |
| 4,441,274 | 4/1984 | Masur | 43/25.2 |
| 4,681,220 | 7/1987 | Beneke | 206/315.11 |
| 5,392,557 | 2/1995 | Harmon et al. | 43/57.1 |

*Primary Examiner*—P. Austin Bradley
*Assistant Examiner*—Jeanne M. Elpel
*Attorney, Agent, or Firm*—Saliwanchik & Saliwanchik

[57] ABSTRACT

A lure container preferably of elongated shape for storing fishing lures and leaders safely without entanglement. The container can easily be opened and closed and is preferably made of transparent or translucent pliable material. In a preferred embodiment the ends of the container are open, which permits ventilation and drainage, as well as accommodation of oversized baits or lures. Internally near one end of the container is a leader bulkhead, and there are external leader securing means which secure the leader to the external surface of the container without kinking.

2 Claims, 3 Drawing Sheets

LURE CONTAINER

BACKGROUND OF THE INVENTION

This invention relates generally to containers for safely storing, displaying, and dispensing fishing lures such that the lures, and their hooks and rigging, do not become entangled or damaged, or cause damage to persons or things which might otherwise come in contact with the lures. The present invention more specifically relates to novel elongate holders for leadered fishing lures of different types, including those with bait attached, and is designed to receive and retain such lures neatly and safely during periods of non-use.

A large variety of leadered fishing lures are available for use in attracting and engaging game fish of different species and sizes. Many of such lures have a monofilament or wire leader which can be up to several feet in length, often terminating at the tie end with a dosed loop for attachment to a fishing line and at the opposite or free end with an attached or integral fish-attracting lure having one or more fishhooks, and commonly having a natural bait affixed thereto. Generally a fisherman will own many such fishing lures, and will have them present in his tackle box or boat when fishing. Lures will be selected and secured to the fishing line of a rod and reel assembly throughout a fishing trip, depending on the species and size of fish which may be present in different areas of the waters being fished.

While fishing from a boat, it is normal to work several fishing rods at a time, and to change lures repeatedly and frequently on each line in an effort to determine which lures will be most successful for attracting fish that day. When using lures with natural bait, the lures must be changed repeatedly and frequently to allow for replacement of missing or tattered bait with a fresh, undamaged bait. As a result of this activity, which at times can become quite frenzied, those lures just taken out of use can entangle or damage lures which are awaiting being put into use.

Upon entanglement, leaders may become damaged, and if made of wire are especially susceptible to kinking, which can result not only in unnatural movement of the lure during fishing, thereby rendering the lure unattractive to the fish, but also can result in weakening of the leader which may lead to frustrating break-offs once the fisherman's prey has been engaged.

Various means have been devised for storing and handling lures in an attempt to avoid some of the aforementioned problems, however, each of the many devices known to the prior art has proven either inconvenient or ineffective in at least one regard. Further, none of the devices known to the prior art solves all of the above problems and at the same time allows for storage of multiple lures rigged with natural baits and leaders, from freezing through thawing, without entanglement or damage to either the baits or the leaders. In recognition of the aforementioned problems in the state of the art, the subject invention has been conceived and has now been reduced to practice.

SUMMARY OF THE INVENTION

The subject invention is a container for storing a fishing lure in a neat and safe manner with adequate ventilation and drainage, and with special provisions for storing the leader portion of the lure. The container is moveable between an open and a closed position. The container comprises first and second container portions having peripheral rim portions extending almost completely therearound which, when the container is in the closed position, define a storage compartment therein. In its closed position, the container is generally elongated, having first and second ends. In a preferred embodiment there are openings in each of said ends which permit not only ventilation and drainage, but also can accommodate over-sized baits or lures which may extend therethrough, and allow passage of the lure's leader from the inside of the container to the outside where it may be nearly and effectively stored without damage or kinking. In a preferred embodiment, there is a bulkhead affixed to the interior surface of the container, proximal to said first end opening, which accommodates and secures one or more leaders within the container, serving not only to prevent entanglement of the leaders but also to aid in positioning and securing any lure within the container. The container is further provided with an external leader-securing strap which secures a coiled leader to the external surface of the container, thereby avoiding entanglement or damage to the leader. Although not necessary, preferably the container is substantially transparent, so that a fisherman can easily see the type of lure contained therein. Further, it is preferred that the container be manufactured of a material which resists crushing and the possible subsequent damage to lures contained therein.

The manner in which the foregoing objects, together with other objects and purposes, may best be understood is from a consideration of the detailed description which follows together with the accompanying drawings.

DETAILED DESCRIPTION OF THE PREFERRED EMBODIMENTS

Figure 1:
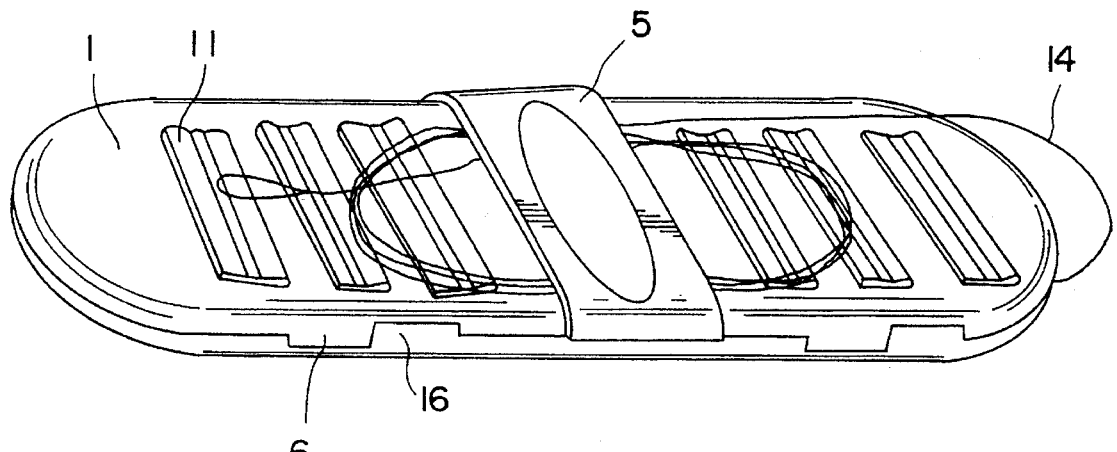
FIG. 1 is a perspective view of the subject invention as it would appear in use in a closed position.

Referring now to the drawings, the container of the subject invention is sized in proportion to contain a fishing lure, or a rigged fishing lure 17, within it. While it is not necessary, it is preferable that the container is transparent so that the contents within it can be observed when the container is in its closed position. In the preferred embodiment, the first container portion 1 is an elongated piece having first and second ends and is connected via hinge means, preferably a hinge 3 and hinge pin 13, to a second container portion 2, also having first and second ends. There is a first end opening 9 and a second end opening 10 in the preferred embodiment of the invention when it is in its closed configuration.

The container is preferably apertured as at 12 to provide for both ventilation and drainage. Louvers 11 partially define apertures 12, and serve to inhibit foreign objects which could damage the lure or bait from entering into the container, yet permit efficient ventilation. However, apertures 12 are not necessary for the invention to function as intended. Peripheral rim portions 8 and 18 extend from first container portion 1 and second container portion 2, respectively, and, in a preferred embodiment, cooperate to help define a first end opening 9 and a second end opening 10. Alternatively, at a minimum, at least one of either rim 8 or rim 18 must be provided with an indentation for allowing passage of a leader 14 from the leadered lure 17, which is housed inside the container, to the outside of the container when the container is in a closed position. In a preferred embodiment, both rim 8 and rim 18 have indentations sufficiently sizeable to permit one or more leaders to pass from the interior of the container through a first end opening 9 to the outside of the container when the container is in a closed position, and of sufficient size so as to define a second end opening 10, which is of sufficient size to allow the tail portion of an oversized lure to extend therethrough. Both first end opening 9 and second end opening 10 also function to permit ventilation and flow through in the preferred embodiment.

The preferred embodiment of the invention is designed to accommodate a plurality of fishing lures. In order that the leaders of each of these lures do not become entangled with one another, in the preferred embodiment there is provided a bulkhead 4, affixed proximal to the first end of the second container portion 2. In another preferred embodiment there is an additional bulkhead affixed proximal to the first end of the first container portion 1 in a position complementary to that of bulkhead 4 such that when the container is in its closed configuration the bulkheads cooperate to secure leader 14. Preferably, bulkhead 4 comprises a plurality of bulkhead slots 7, which aid in securing the leader 14 of each fishing lure 17 which is stored within the subject invention. In a preferred embodiment, the slots may be of varying depths and varying widths in order to accommodate a variety of types of leaders. Ideally, but not necessarily, bulkhead slots 7 are substantially V-shaped or Y-shaped indentations in bulkhead 4. Bulkhead slots 7 not only may aid in securing a leader, but also serve to lift and separate leaders one from another if more than one leadered fishing lure is stored within the container. By being positioned such that it is set back from the periphery and from the first end of container portions 1 and 2, bulkhead 4 provides a means for securing, supporting, and separating leaders which reduces the chances of kinking from contact with the leader and the first ends of the container when compared to other embodiments. In an alternative embodiment, bulkhead 4 has no slots, but rather is sized such that it presses against the inner surface of the first container portion 1 when the container is in the closed configuration. In this manner, leader 14 would be frictionally secured against the inner surface of tho first container portion 1 when the container is in its closed configuration. Optionally, a second bulkhead piece could be affixed to the inner surface of first container portion 1, proximal to the first end opening 9, in a position complementary to bulkhead 4 such that when the container is in the closed configuration it presses against bulkhead 4 and thereby frictionally secures leader 14 in place. Ideally, the bulkhead may be made of plastic or foam. In yet another embodiment, peripheral rims 8 and 18 extend substantially around first and second container portions 1 and 2, but have at least one indentation proximal to the first end of either first container portion 1 (in peripheral rim 8) or second container portion 2 (in peripheral rim 18), or both of them, such that a leader 14 may pass through the aperture created by said indentation to the outside of the container. Alternatively, peripheral rims 8 and 18 may also have additional indentations such that in the closed configuration they define a second end opening 10.

Figure 3:
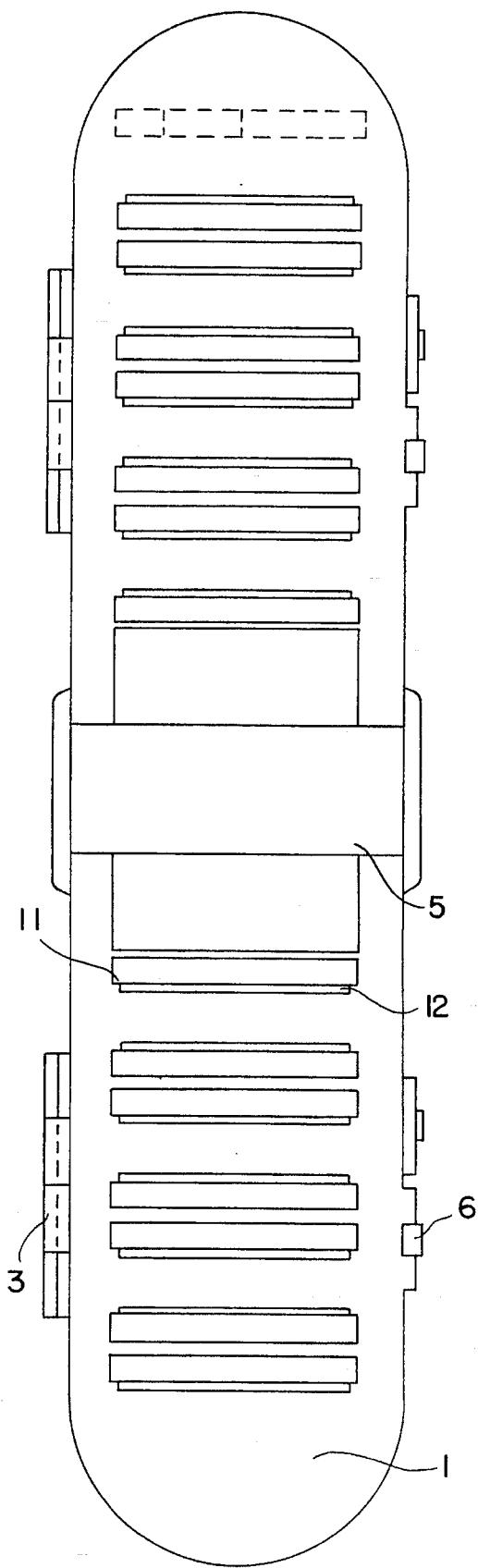
FIG. 3 is a top view of a preferred embodiment of the invention in its closed position.
Figure 4:
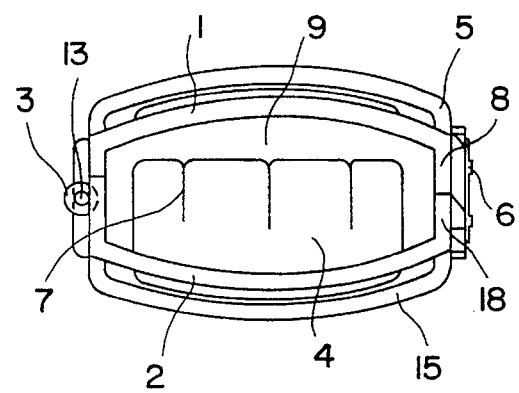
FIG. 4 is a perspective view of a preferred embodiment of the invention when viewed end-on through the first end opening in its closed position.
Figure 5:
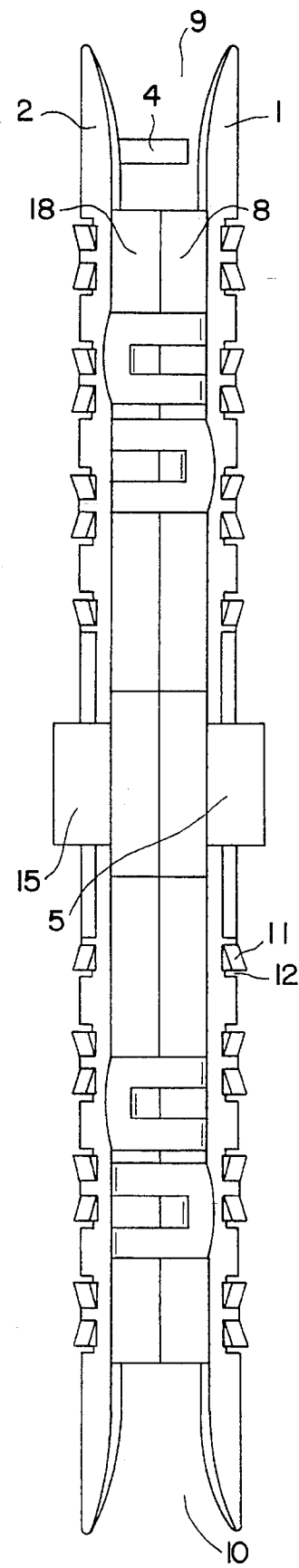
FIG. 5 is a side view of a preferred embodiment of the invention in its closed position.

The closure means of the container can be any of a number of means well-known to be suitable for keeping semi-rigid plastic containers dosed. For example, the resilient characteristics of most plastics permit a wide variety of hook and latch configurations to be suitable for this purpose. One such design is illustrated in FIGS. 3, 4, and 5 herein. While the preferred embodiment depicted in FIGS. 3 and 5 shows four sets of hook and latch mechanisms, only one such mechanism is necessary for keeping the container closed. In this particular embodiment, the hooks protrude from the peripheral rims 8 and 18 such that their barbs extend outward from the external surface of the container when the container is in the closed position. In an alternative embodiment such as that depicted in FIGS. 1 and 2, the hooks also extend from the peripheral rim portions, but the barbs protrude inwardly from the hooks when the container is in its closed configuration. In this alternative embodiment, the hooks are configured complementary to the shape of the external surface of first and second container portions 1 and 2, and the barbs encounter catches which are located in a complementary position on the external surfaces of first and second container portions 1 and 2. Per preferred placement, pliable plastic latches and plastic-portions protectively lock large leadered lures preventing lamentable lure laceration, leave loosely looped leaders limber, likely preventing perturbing lure loss, and permit prompt lure location. As will be immediately dear to anyone skilled in the art, there are a wide variety of closure mechanisms which could be adapted for use in the subject invention. They preferably, although not necessarily, will be molded from plastic and be an integral part of the container.

While the preferred embodiment depicted in FIGS. 3 and 4 comprises a hinge mechanism consisting of a hinge 3 and hinge pin 13, alternative embodiments may comprise other types of hinge mechanisms well-known in the art, such as a continuous piece of resilient plastic which integrally connects the first and second container portions 1 and 2 along one edge, or at a plurality of locations along one edge.

In the preferred embodiment, leader retaining straps 5 and 15 are made of the same material as first and second container portions 1 and 2, and thus not only provide added protection and security for leader 14 but also confer additional structural rigidity to the container. In one version of the preferred embodiment, leader retaining straps 5 and 15 are integrally connected to first and second container portions 1 and 2, respectively. In an alternative version of the preferred embodiment, leader retaining strap 5 or 15 can be clipped or snapped into place on the external surface of the container.

The subject invention can be made from any of a wide variety of materials known in the art, so long as it is resistant to saltwater corrosion, and confers sufficient structural rigidity on the subject invention such that it resists crushing. Preferably, the subject invention is manufactured from a transparent or translucent plastic so that one can easily see the type of lure or bait stored in the closed container. The subject invention is easily manufactured by injection molding or other techniques which are well-known in the art.

Figure 2:
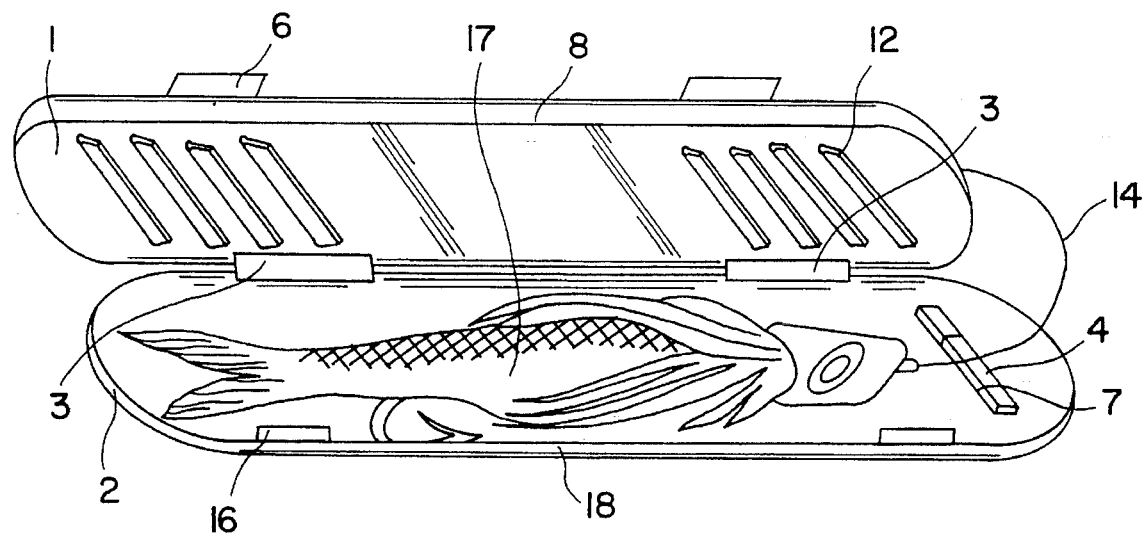
FIG. 2 is a perspective view of the subject invention as it would appear in use in an open position.

In use, the subject invention is initially positioned in its open configuration as seen in FIG. 2, so that one or more fishing lures 17 can be placed therein. Fishing lure 17 is arranged such that the leadered end is closest to the bulkhead 4 and such that the leader rests in bulkhead slot 7. Once lure 17 and leader 14 are thusly positioned, container portions 1 and 2 are then moved towards one another about a longitudinal axis extending through hinge 3 until closure mechanisms 6 and 16 are engaged to releasably maintain the container in its closed position. When the container is in its closed position, leader 14 extends from the inside of the container through first end opening 9, to the outside of the container. The leader may then be coiled and securely tucked under leader retaining strap 5 or 15, which prevents the leader from becoming entangled or kinked. In its closed position, the container protects lure 17 and any bait rigged thereon from damage, or from damaging other lures, when not in use. When one desires to use the lure which is stored inside the container of the subject invention, the container is easily returned to its open position by forcibly disengaging the closure mechanisms and moving the container portions 1 and 2 away from each other about the longitudinal axis which passes through hinge 3. The lure may then be retrieved from its position in the container, and the leader removed from bulkhead slot 7 and from securement under leader retaining strap 5 or 15.

Thus it can be seen that the container of the subject invention is capable of storing a fishing lure in a neat and safe manner with adequate ventilation and drainage and with special provisions for storing the leader portion of the lure against the outside of the container where it is protected from damage, entanglement, or kinking.

The invention, in its broader aspects, is not limited to the specific details shown and described. Departures may be made from such details without departing from the principles of the invention. In view of the foregoing description there are many modifications and alternative embodiments of the subject invention which will immediately be obvious to those skilled in the art. Accordingly, the subject invention is defined and limited solely by the following claims.

I claim:

1. A closeable container for at least one fishing lure and a leader attached thereto comprising:

(a) a first container portion having a peripheral rim portion and a second container portion having a peripheral rim portion, said first container portion operably connected to said second container portion by a hinged means, wherein the peripheral rim portion of said first container portion engages the peripheral rim portion of said second container portion when said container is in the closed position, said container being of generally elongate configuration and having first and second ends;

(b) a means for maintaining said container in said closed position; and (c) a rigid leader-retaining strap attached to one of said container portions such that said rigid leader-retaining strap provides structural support that serves to inhibit crushing of said container;

said container further comprising a leader-securing, internal bulkhead having a plurality of slots therein, and said container having at least one end opening defined by said first and second container portions.

2. A method of storing a fishing lure and a leader attached thereto, comprising the steps of placing a fishing lure in a container, inserting the leader into a slot of an internal bulkhead having a plurality of slots, closing said container, and securing the leader beneath an external rigid leader-retaining strap that provides structural support to said container.

* * * * *

UNITED STATES PATENT AND TRADEMARK OFFICE
CERTIFICATE OF CORRECTION

PATENT NO. : 5,517,783
DATED : May 21, 1996
INVENTOR(S) : Dwight A. Edgar

It is certified that error appears in the above-indentified patent and that said Letters Patent is hereby corrected as shown below:

Column 1: Line 19: "with a dosed loop" should read --with a closed loop--.

Column 2: Line 9: "be nearly and" should read --be neatly and--.

Column 3: Line 48: "of tho first" should read --of the first--.

Column 4: Line 1: "plastic containers dosed." should read --plastic containers closed--.; Line 24: "immediately dear" should read --immediately clear--.

Signed and Sealed this

Twenty-first Day of January, 1997

Attest:

BRUCE LEHMAN

*Attesting Officer*                *Commissioner of Patents and Trademarks*